United States Patent Office 3,095,453
Patented June 25, 1963

3,095,453
HYDRATION OF ACETYLENE TO PRODUCE ACETALDEHYDE
Roger M. Dille, La Habra, Ronald W. Chapman, Whittier, John C. Ahlborn, Pomona, and Du Bois Eastman, Whittier, Calif., assignors to Texaco Inc., New York, N.Y., a corporation of Delaware
No Drawing. Filed Dec. 3, 1959, Ser. No. 856,922
1 Claim. (Cl. 260—605)

This invention relates to the hydration of acetylenic compounds to form carbonyl compounds. More particularly, it is concerned with the catalytic hydration of acetylene to produce acetaldehyde employing a novel catalyst composition.

An object of this invention is to provide a novel catalyst for the hydration of acetylene to acetaldehyde. Another object is to provide a catalyst which will not form undesirable precipitates during the reaction period. Still another object is to provide a catalyst which does not readily lose its activity. A further object is to provide a method utilizing the novel catalyst. A still further object is to provide a method which produces increased yields of acetaldehyde. Other objects will become apparent from the accompanying discussion and disclosure.

A well known method for converting acetylene to acetaldehyde is to contact the pure acetylene or acetylene-containing gas with an aqueous catalytic solution at an elevated temperature. As the acetylene comes in contact with the aqueous catalytic solution, it is hydrated to acetaldehyde in the following manner:

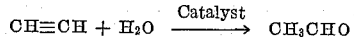

$$CH \equiv CH + H_2O \xrightarrow{Catalyst} CH_3CHO$$

Since the above hydration reaction is normally conducted at a temperature in excess of the boiling point of acetaldehyde (68° F.) the acetaldehyde product emerges from the liquid catalyst as a gas and is recovered by standard methods such as by fractional condensation or by absorption in an absorbent medium. In the latter recovery method the acetaldehyde is subsequently separated from the absorbent medium by fractional distillation.

In the past hydration catalysts often had one or more undesirable features such as (1) diminishing activity during the reaction period with a corresponding decrease in acetaldehyde yield, (2) forming undesirable precipitates thereby clogging the reaction zone, and (3) converting a relatively low percentage of acetylene into acetaldehyde. An example of a hydration catalyst having the aforementioned defiiciencies is a combination of acetic acid, water and mercuric oxide or mercuric sulfate.

We have discovered that by including a small amount of sulfuric acid in the catalyst combination identified immediately above yields of acetaldehyde product are not only increased about 50% or more, but also the catalyst combination maintains the same level of activity and does not form undesirable precipitates through the reaction period. More specifically, we have discovered a novel catalyst for the conversion of acetylene to acetaldehyde comprising acetic acid, water, sulfuric acid and mercuric oxide or mercuric sulfate. It is to be noted that the water ingredient in addition to being an agent in the catalytic combination can act as a reactant for the hydration of acetylene. Alternatively the water reactant may be supplied by saturating the acetylene gas prior to its introduction into the catalyst. This saturation is normally acomplished by bubbling acetylene gas or acetylene gas containing mixtures through water maintained at an elevated temperature, e.g. 150–200° F.

The ingredient proportions of the novel catalyst are advantageously maintained between about 25 and 96 wt. percent acetic acid, 4 and 75 wt. percent water, 0.1 and 2 wt. percent sulfuric acid and 0.05 and 4 wt. percent mercuric oxide or mercuric sulfate.

The catalyst of our invention can be readily prepared by adding water, sulfuric acid and mercuric oxide or mercuric sulfate to acetic acid, preferably with stirring. In the formulation of the novel catalyst composition it is desirable to add the sulfuric acid ingredient last in order to dissolve any precipitates which may form during said formulation. The novel catalyst is desirably prepared at temperatures ranging from 80–200° F. in order to promote the rapid solution of the solid ingredients. However, the catalyst can also be readily formed at room temperature and lower.

In the method of the invention acetylene or an acetylene-containing gas (between about 1–100 wt. percent $C_2H_2$) is contacted with the liquid catalyst at a temperature of at least about 100° F., preferably between 170 and 200° F. Reaction temperatures of above 212° F. may also be employed. If the hydration reaction is conducted at a temperature above about 212° F. superatmospheric pressure, e.g. 1–100 p.s.i.g., is desirably impressed upon the reaction system to prevent excessive vaporization of the water component. In the preferred procedure, the acetylene-containing gas saturated with water vapor is introduced into the bottom section of the reaction apparatus holding the liquid catalyst solution and bubbled therethrough. At the reaction temperature the acetaldehyde product exits from the catalytic solution as a gas and may be recovered by any of the standard methods such as fractionally condensing said product from the exit gases. Another method of recovery is bubbling the exit gases into water maintained at a temperature and pressure favoring the liquid state of acetaldehyde. The water under such conditions selectively absorbs the acetaldehyde from the exit product gas and the acetaldehyde is subsequently released from its water solution by fractional distillation.

A suitable source of acetylene is derived from the reaction of calcium carbide and water. Acetylene produced in this manner can be utilized in our process either in pure form or diluted with gaseous substances preferably with gases inert to the ingredients of the catalyst such as nitrogen. It is preferred to employ dilute gaseous mixtures of acetylene as the reactant, e.g. 1–10 wt. percent acetylene, since the dilute mixtures promote more thorough contact between acetylene, water and catalyst, and furthermore, are more commercially practicable. Other standard sources of acetylene may of course be employed.

The following examples further illustrate my invention:

Example 1

A gaseous mixture consisting of 98 wt. percent nitrogen and 2 wt. percent acetylene was saturated with water vapor by bubbling the mixture through water maintained in a glass washing bottle located in a water bath of 180° F. The gaseous mixture was then withdrawn from the top of the washing bottle and bubbled at a rate of 0.5 cu. ft./hr. into the bottom section of a vertically positioned glass hydration tube of 1¼ x 26 inch dimensions filled with 4 x 4 mm. glass Raschig rings and 300 cc. of catalytic solution. The catalytic solution consisted of 94.5 wt. percent acetic acid, 4 wt. percent water, 1 wt. percent mercuric oxide and 0.5 wt. percent sulfuric acid. The hydration tube was maintained in a water bath of 180° F. and the catalytic solution in said tube was held at a constant level by placing or removing the previously described washing bottle from the 180° F. water bath. The exit gases containing the acetaldehyde product were withdrawn from the top of the hydrator and analyzed. The foregoing procedure was conducted for a four hour period. During the reaction period the acetylene content of the feed and product gases was measured by gas chromatography on a continuous basis. The acetaldehyde content from the product gas was periodically measured in a mass spectrometer. At the end of the first and fourth hours of the reaction period analysis found that 99% of the acetylene reactant was being converted into acetaldehyde. In addition, at the end of the fourth hour the catalyst solution was clear and no undesirable precipitate was detected in the reaction zone.

*Example II*

The procedure of Example I was repeated utilizing a catalytic solution consisting of 89.6 wt. percent acetic acid, 7 wt. percent water, 3 wt. percent mercuric oxide and 0.4 wt. percent sulfuric acid. During the reaction period an average of 89% of the acetylene reactant was converted to acetaldehyde and no precipitate was noticeably formed in the actalytic solution.

*Example III*

The procedure of Example I was repeated with the exception of the catalyst. The catalyst employed was composed of 95% acetic acid, 4 wt. percent water and 1 wt. percent mercuric oxide. During the reaction period an average of 60 wt. percent of the acetylene reactant was converted to acetaldehyde. In addition, a black precipitate formed in the catalytic solution during the reaction period and it lodged in the Raschig rings.

*Example IV*

The procedure of Example I is employed with the exception that the reaction period is extended to 18 hours and the catalyst consists of 94.5% acetic acid, 4% water, 0.5% sulfuric acid and 1% mercuric sulfate. At the end of the first and eighteenth hour of the reaction period, 91% of the acetylene is converted into acetaldehyde. No undesirable precipitate is detected in the glass tube reaction zone.

*Example V*

The procedure of Example IV is repeated with the exception of the catalyst. The catalyst employed consists of 95% acetic acid, 4% water and 1% mercuric sulfate. At the end of the first hour of the reaction period, 91% of the acetylene is converted into acetaldehyde. At the end of the eighteenth hour the rate of conversion drops to 69%. Also, a black precipitate forms in the catalytic solution during the reaction period and lodges in the Raschig rings.

As can be seen from a comparison of Examples I, II and IV versus Example III, our novel catalyst produces acetaldehyde in yields about 50% greater than a closely related catalyst. In addition, a comparison between Example IV and V shows that no loss of activity by our novel catalyst occurred during the reaction period while a substantialy loss was incurred by a comparative catalyst. Still further, the preceding comparisons also establish that representatives of our novel catalyst do not form undesirable precipitates during the reaction period while such is not the case for the comparative compositions.

All percentages, proportions and ratios hereinbefore and hereinafter described are based on weight unless otherwise stated.

Obviously, many modifications and variations of the invention as hereinbefore set forth may be made without departing from the spirit and scope thereof and therefore only such limitations should be imposed as are indicated in the appended claim.

We claim:

A method for the preparation of acetaldehyde consisting essentially of passing a water saturated acetylene gas through a liquid catalytic solution at a rate of 0.5 cubic feet of said gas per 300 ccs. of said solution, while maintaining said solution at a temperature of between about 100 and 200° F. and recovering said acetaldehyde, said solution consisting of 94.5 wt. percent acetic acid, 4 wt. percent water, 0.5 wt. percent sulfuric acid and 1 wt. percent mercuric sulfate.

References Cited in the file of this patent
UNITED STATES PATENTS

| | | |
|---|---|---|
| 2,153,985 | Lieseberg et al. | Apr. 11, 1939 |
| 2,254,212 | Dinwiddie | Sept. 2, 1941 |
| 2,303,279 | Isham | Nov. 24, 1942 |
| 2,815,332 | Grosser | Dec. 3, 1957 |
| 2,842,504 | Jones | July 8, 1958 |

FOREIGN PATENTS

| | | |
|---|---|---|
| 5,132 | Great Britain | Apr. 3, 1915 |